Patented Nov. 24, 1936

2,061,848

UNITED STATES PATENT OFFICE 2,061,848

CERAMIC CATALYST AND METHOD OF MAKING SAME

Barney S. Radcliffe, Oak Park, Ill.

No Drawing. Application June 12, 1935,
Serial No. 26,245

1 Claim. (Cl. 23—234)

This invention relates to an improved refractory support for catalysts capable of maintaining its working efficiency under strenuous service.

Experience has proved that when known ceramic catalysts are employed to convert hydrocarbon fuels in furnaces, internal combustion engines and the like, the mechanical and thermal strains to which they are subjected rapidly disintegrates the supports.

The main object of my invention is to provide a ceramic structure supporting the finely disseminated catalyst which will maintain a high radiant temperature such as is required for flameless oxidation, and stand up under the stress of regular service; to provide such a structure which absorbs heat rapidly; to provide a ceramic structure of great tensile strength; to provide a structure which will repeatedly and rapidly change through a large temperature range without damage; and to provide a structure having throughout its body numerous pores or channels in which the catalyst can be evenly distributed in a finely divided state.

An appropriate form for a ceramic catalyst might be a hollow right cylinder but the size and shape depend upon the characteristics of the device in which the catalyzer is to be used and forms no part of the invention herein claimed.

For fluid hydrocarbons the right cylinder is usually selected and placed as a part of the conduit. The body of my refractory ceramic support is preferably made by the procedure known in ceramics as slip-casting using a plaster of Paris mould. In the making of my improved structure, the slip is prepared by taking carbide of silicon in granular form, passing a screen of about 80 mesh, mixing the same with approximately 20% by weight with plastic clay such as Tennessee ball clay for the purpose of forming a bond. Water is added until the mixture is running smooth, whereupon it is poured into the plaster mould and allowed to stand until it gets a wall set of the desired thickness. By this slip-casting method pores or minute channels are formed in the walls of the dried form, which channels in the main extend radially from the center of the cylinder. The fluid central portion is then poured off and the mould removed. The cylinder is then dried, and finally fired in a furnace, the clay forming a bond for the carbide of silicon, at the same time producing an exceptionally strong ceramic structure with fine capillary pores in its walls.

The ability of carbide of silicon to withstand high temperatures and even the strongest acids is well known. After firing, the porous silicon carbide structure is soaked in a saturated solution of magnesium chloride and then immersed in ammonia carbonate precipitating magnesium carbonate as a fine coating over the surface of the support. The structure is gradually dried out and finally heated. When the magnesium coating has dried and cooled, the structure is then soaked in a mixture of platinum chloride 90% and palladium chloride 10%, then allowed to dry slowly.

When the structure is now heated to a comparatively high temperature, platinum black is disseminated in the exposed surface by the reduction of the acid solution of the platinum salts. If, however, the structure saturated with the acid solution is first treated with ammonia before being heated, then spongy platinum is deposited.

Elements of the platinum group, and especially platinum and palladium, absorb large quantities of hydrogen and other gases and become very "active". For this reason either or both are largely used as catalytic agents. The absorption of gases by solid bodies is accompanied by disengagement of heat. When the catalyst is in a fine state of division such as platinum black or spongy platinum, the absorption is very rapid and strong combustion of the gases results.

While the use of magnesium as a coating on the ceramic supporting structure is here described, it is to be noted that the use of magnesium or other coating is not essential but is advantageous and that with careful manipulation a fixed coating of either platinum black or spongy platinum will form directly on the fresh ceramic structure and operate with the same permanency and efficiency. In operation this ceramic structure is used either as a conduit or as a sieve to bring the fluid hydrocarbon in intimate contact with the catalyst on the support.

The hereindescribed structure has a surface little susceptible to adhesions and is remarkably free from the tendency to accumulate slag and other impurities that might be present in the fuel oil or gas with which it is used.

I claim:

The method of making a ceramic catalyst which consists in mixing silicon carbide with about twenty percent. of its weight of plastic clay, moulding the same to form and firing to produce a porous solid mass, precipitating magnesium carbonate in and on the mass from a solution of a soluble magnesium salt and drying the mass, impregnating the mass with a solution of a salt of the platinum group, drying, and then roasting to free the metal from its salt.

BARNEY S. RADCLIFFE.